United States Patent [19]

Haldenwanger et al.

[11] Patent Number: 4,771,997
[45] Date of Patent: Sep. 20, 1988

[54] MOTOR VEHICLE FIBER-REINFORCED SYNTHETIC MATERIAL LEAF SPRING OR TRANSVERSE LINK WITH END CLAMP/POWER-INDUCTION UNIT

[75] Inventors: Hans-Gunther Haldenwanger, Ingolstadt; Manfred Schneeweiss; Siegfried Schaper, both of Wettstetten, all of Fed. Rep. of Germany

[73] Assignee: Audi AG, Ingolstadt, Fed. Rep. of Germany

[21] Appl. No.: 41,398

[22] Filed: Apr. 23, 1987

[30] Foreign Application Priority Data

Apr. 24, 1986 [DE] Fed. Rep. of Germany ....... 3613804

[51] Int. Cl.$^4$ .......................... B60G 7/00; B60G 7/02; B60G 11/02; B60G 11/12; F16F 1/26
[52] U.S. Cl. ..................................... 267/260; 267/149; 267/158; 280/719; 280/720
[58] Field of Search .......................... 267/47–50, 267/36.1–37.4, 260–271, 273, 277, 283, 154, 148–149, 158–165; 280/718–720, 699, 669

[56] References Cited

U.S. PATENT DOCUMENTS

| 1,560,115 | 11/1925 | Smith | 267/265 |
|---|---|---|---|
| 3,243,175 | 3/1966 | Sherwood | 267/273 |
| 3,528,649 | 9/1970 | Jacob | 267/273 |
| 3,968,958 | 7/1976 | Huchette et al. | 267/149 X |
| 4,322,061 | 3/1982 | Masser | 267/269 |
| 4,411,159 | 10/1983 | Spear et al. | 267/158 X |
| 4,557,500 | 12/1985 | Collard et al. | 280/719 X |
| 4,575,057 | 3/1986 | Robertson | 267/47 |
| 4,613,152 | 9/1986 | Booher | 280/719 X |
| 4,696,459 | 9/1987 | Woltron et al. | 267/149 X |
| 4,725,074 | 2/1988 | Stevens | 280/719 |

FOREIGN PATENT DOCUMENTS

| 0047074 | 3/1982 | European Pat. Off. | 267/148 |
|---|---|---|---|
| 0163742 | 10/1982 | Japan | 267/148 |
| 0039532 | 9/1986 | Japan | 267/148 |
| 2021731 | 12/1979 | United Kingdom | 267/149 |

*Primary Examiner*—Douglas C. Butler
*Attorney, Agent, or Firm*—Reed Smith Shaw & McClay

[57] ABSTRACT

The disclosure relates to a device with a flat component made of fiber-reinforced synthetic material and an end power induction unit, in particular a leaf spring or transverse link for motor vehicles. The flat component essentially enters the power induction unit without a change in fiber direction and is contained therein by a clamp. The contact point on the power induction unit is displaced by a distance "a", asymmetrically to the fiber levels such that a resultant of perpendicular forces and forces acting parallel to the fiber direction cause a reduction in stress and momentary relief. The portion of the flat component in the power induction unit has a length, using the perpendicular projection of the point of application of force, that is at least two-thirds of the length from the point of application of force to the resultant in the fiber plane or at least corresponds to quantity "a".

9 Claims, 2 Drawing Sheets

MOTOR VEHICLE FIBER-REINFORCED SYNTHETIC MATERIAL LEAF SPRING OR TRANSVERSE LINK WITH END CLAMP/POWER-INDUCTION UNIT

BACKGROUND AND DISCUSSION OF THE INVENTION

The invention relates to a device with a flat component made of fiber-reinforced synthetic material and an end power induction unit, in particular at a leaf spring or transverse link for motor vehicles. Various elements of the device cooperate to reduce certain loads and stresses typically imposed on leaf springs of this type.

In generic devices, such as a leaf spring made of fiber-reinforced synthetic material, particular attention must be paid to the power induction into the component, because damage due to excessive bending moments or shear stress originates or appears almost regularly at a power induction unit. Where a leaf spring is installed transversely in a motor vehicle, it must absorb both vertical forces due to the static and dynamic axle load and high lateral forces while taking curves. While braking the vehicle, it is still possible for significant longitudinal forces or torsion couples to appear. In this, the vertical forces have a perendicular effect on the directed fiber layers of the leaf spring, while the lateral forces are parallel, and thus in the fiber direction. Particularly high bending moments and shear stress appear while taking curves because here great vertical forces from the dynamic axle weight shift is added to the great amount of lateral force. These high strains can result in excessive stress, especially in the area of the power induction unit; damage that can occur includes separation of the upper and lower levels of directed fibers, fiber tears on these levels and deformations on the component. The object of the invention is to reduce the stress in the area of the power induction unit for the generic device, using simple means.

This object is accomplished by features of the invention described herein. A feature of the invention is the application of force at the power induction unit asymmetrically to the fiber levels. This permits absorption of the component or leaf spring end in the power induction unit such that the latter experiences a moment of torsion from the lateral forces, which is directed against the vertical forces of the axle weight. The result is a considerable reduction in bending stresses in the area of the power induction unit, and a reduction in shear stress. The definition of the length of the component or of the leaf spring end beyond the point of application of force in the power induction unit means an equivalent decrease in stress and a reduction of shear stress for lateral forces acting in the opposite direction.

As described in detail hereinafter the power induction unit and the end portion of the leaf spring are specially configured to insure the spring is properly retained and the power is absorbed as desired. In particular, wedge-shaped design of the end portion of the component has proven to be particularly advantageous and capable of bearing stress.

Insofar as additional, one-sided, relatively high torsion couples act on the component, as sometimes happens, for example, with a wheel-drive leaf spring while braking a vehicle, the point of application of force on the power induction unit can be arranged asymmetrically to the spring itself. The power induction unit is formed of two separate parts with clamping means involving little or no invasive elements to the fiber material. The arrangement of the screws or bolts about the periphery of the end portion means that the effective cross section of the component or of the leaf spring is fully preserved.

The above has been a brief description of deficiencies in the prior art and advantages of the invention. An embodiment of the invention is described below in greater detail.

DETAILED DESCRIPTION OF THE PREFERRED EMBODIMENT

Figure 1:
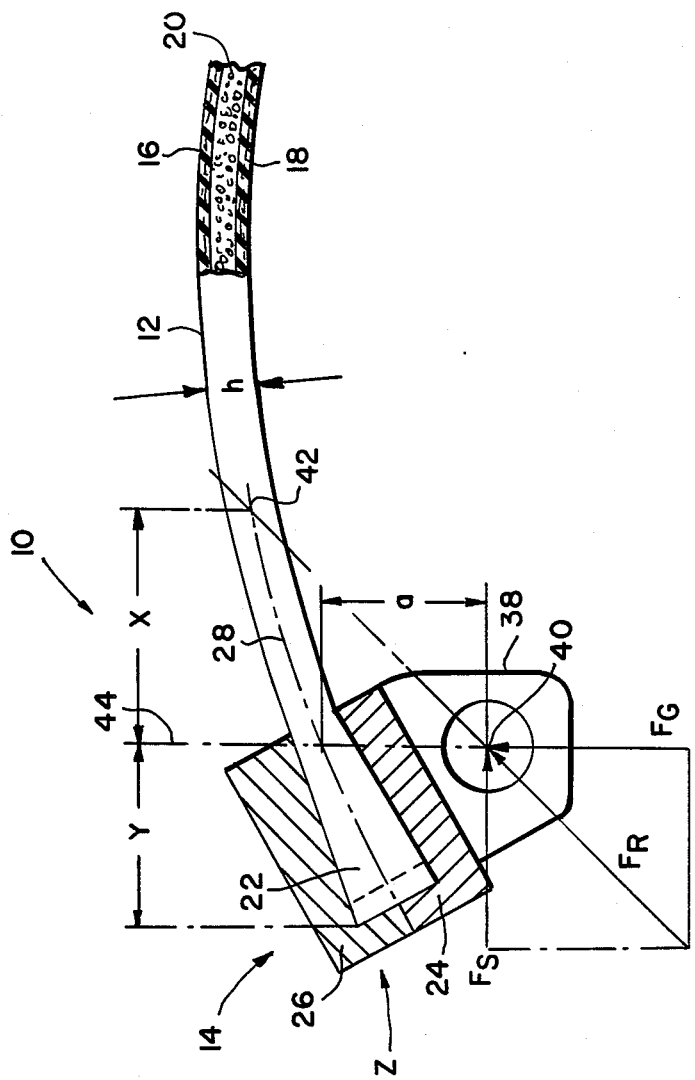
FIG. 1 shows a device with a leaf spring of a motor vehicle as a flat component and a power induction unit in a cross section of Line I—I in FIG. 2.

A device 10 has a leaf spring 12 as a flat component and a power induction unit 14. The leaf spring 12, made of glass fiber reinforced synthetic resin, consists of an upper layer 16, a lower layer 18 and a middle component layer 20. The upper and lower layers 16, 18 have directed glass fibers for the length of leaf spring 12. The compound layer 20 contains undirected fibers embedded in a synthetic resin matrix.

Leaf spring 12 has a rectangular cross section. Its height h becomes less as it approaches the power induction unit 14, but then increases in a wedge shape across a length y. This wedge-shaped end section 22 is form-fitted in the power induction unit 14, whereby the power induction unit 14 is under prestress both on the front face and on the peripheral faces of section 22. In addition, the power induction unit 14 is divided into a base or lower section 24 and an upper section 26, in a plane corresponding approximately to the neutral fiber 28 of the leaf spring 12, whereby the two sections are held together by several screws 30, 32. The two screws 32 secure front recesses 34 of the leaf spring 12, while the two screws 30, or their corresponding screw threads are lateral to the leaf spring 12. This arrangement of the screws 30, 32 ensures on the one hand an even grip and a high-tensile form closure of the spring 12 in the corresponding recess of the power induction unit 14, without the effective cross section of the leaf spring 12 being weakened.

A spring eye or journal 38 positioned at the power induction unit 14, or rather at the base section 24, through which the leaf spring 12 or the power induction unit 14 can be connected to the wheel drive of the vehicle, which is not depicted. Via the spring eye 38, the lateral forces Fs or the axle loads are passed to the leaf spring 12. In this process, the theoretical contact point 40 of the spring eye 38 is displaced by a quantity "a" asymmetrically to the neutral fiber 28 or to the fiber level of the leaf spring 12 contrary to force FG. Through this displacement, the lateral force Fs exerts a twisting moment on the power induction unit 14 that is directed against the force FG.

From the two forces Fs and FG there emerges a resultant force FR, which results in a reduction of bending moments due to the axle load and shear stress affecting the leaf spring 12 in the area of the neutral fiber 28, especially around point 42, which is defined from the projection of the resultant force FR by the neutral fiber 28 of the leaf spring 12.

The leaf spring 12 is dimensioned and incorporated in the power induction unit 14 such that its free clamping length y in the power induction unit 14, calculated from a perpendicular 44 through the point of application of force 40 to its front face, is approximately the same as length X, which is determined from this same perpendicular 44 and the intersecting point 42. This length Y corresponds approximately to quantity "a", which defines the contact point 40 from the neutral fiber 28 of the leaf spring 12. As shown in this specific embodiment Y is about two-thirds of X.

Figure 2:
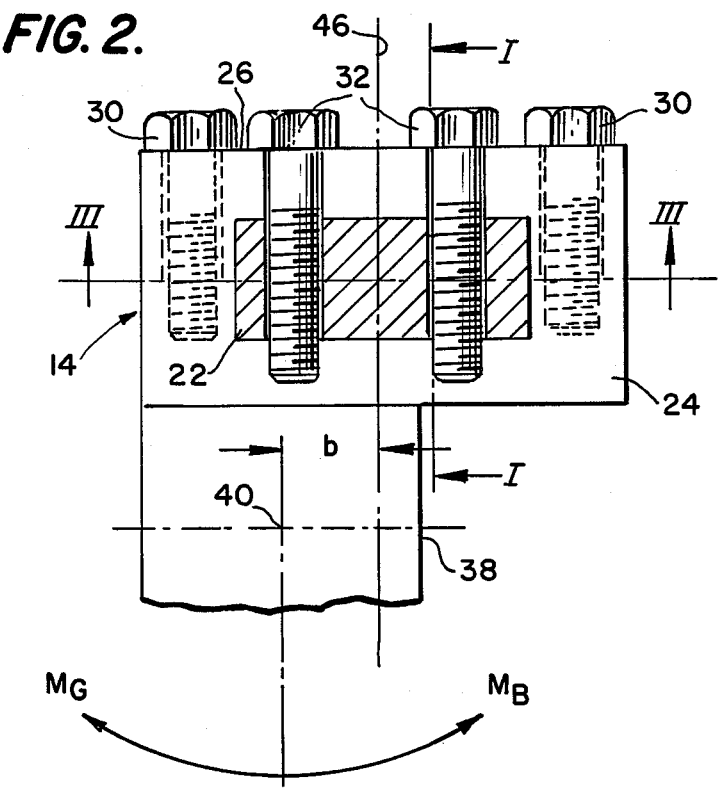
FIG. 2 is a view of the power induction unit in the direction of Arrow Z in FIG. 1.
Figure 3:
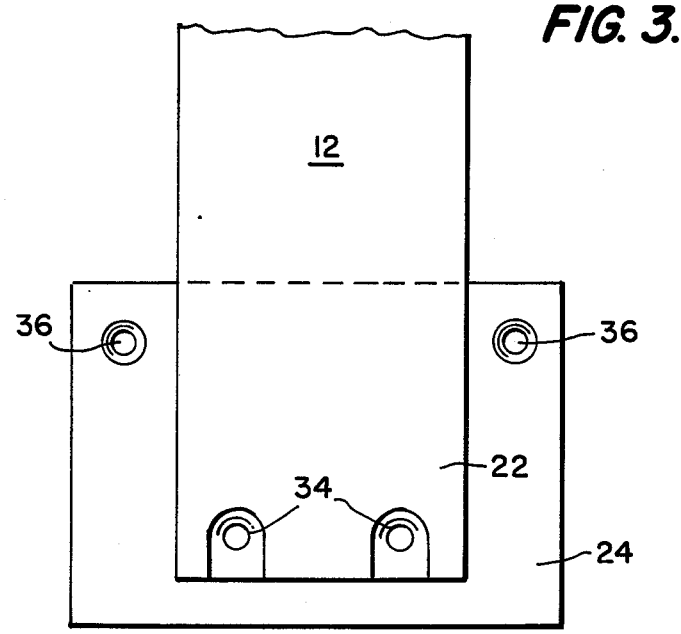
FIG. 3 is a view in keeping with Line III—III of FIG. 2 in the plane of osculation of the power induction unit.

As FIG. 2 shows, the spring eye 38 opposite the perpendicular middle level of the leaf spring 12 is displaced from the middle by quantity b. Through this, a twisting moment MG affecting the leaf spring 46 and based on force FG emerges. This twisting moment functions in the sense of a reduction of a much larger twisting moment MB, which acts upon the wheel drive formed by the leaf spring 12 when the vehicle is braked, by way of its wheel brakes. This twisting moment MB is then calculated without the counter-twisting moment MG based on the displacement b of the spring eye 38 with respect to the leaf spring 12.

As is clear from the drawing, especially FIG. 1, the end section 22 of the leaf spring 12 enters the power induction unit 14 without significant changes in fiber direction in the upper and lower layer 16, 18 of the leaf spring 12. This is of considerable importance, because this means that lateral forces Fs are transmittable in both the direction indicated in the drawing and in the opposite direction, without there being impermissibly high bending stress or impermissibly high shear stress in the compound layer 20 in layers 16, 18.

Instead of the wedge depicted for the end section 11, other form-fitted shapes, such as a double wedge with two shorter, diverging or converging wedge sections, are also possible.

What is claimed:

1. An apparatus for supporting a motor vehicle having a leaf spring comprising:
   (a) a flat portion made of fiber-reinforced synthetic material;
   (b) an end power induction member;
   (c) said flat portion including an upper and a lower layer made of directed fibers that are connected by a middle compound layer;
   (d) said power induction member including means for securing said member to an axle of said vehicle;
   (e) said power inducton member cooperating with said flat portion to provide means for inducing perpendicular forces, and forces parallel to the fiber direction;
   (f) said flat portion passing into the power induction member with substantially constant fiber direction and being held therein;
   (g) said power induction member and said flat portion cooperating to provide means for applying a force at the power induction member asymmetrically to the fiber planes such that a resultant force functioning parallel to the fiber direction causes a reduction in tension and momentary relief on the said flat portion; and
   (h) said flat portion in the power induction unit being kept at a length beyond the perpendicular projection of the point of application of force at said axle corresponding to at least two-thirds of the length from the point of application of force to the resultant force in the fiber plane.

2. The apparatus according to claim 1 further comprising clamping means wherein the end of the flat portion is completely enclosed by said power induction member and held therein by said clamping means.

3. The apparatus according to claims 1 or 2, wherein the flat portion within the power induction unit has wedge-shaped configuration.

4. The apparatus according to claim 1, wherein the means for securing said power induction member to said axle cooperates with said axle and said flat to provide means for applying said force at the power induction member assymmetrically is displaced asymmetrically to the middle axis of the flat portion.

5. The apparatus according to claim 1, 2 or 4 wherein the power induction member includes a first part and a second part for holding the end of said flat portion therebetween; said first and second parts bound together by screws to avoid interruption of fiber continuity in the flat portion.

6. An appartus for supporting a portion of a motor vehicle comprising:
   (a) a leaf spring of the fiber-reinforced synthetic material having a rectangular cross-section, said leaf spring having a neutral axis extending the length of said spring;
   (b) a power induction member for holding one end of said leaf spring;
   (c) said power induction member including an upper section and lower section and means for clamping said upper and lower sections together about said one end to secure said leaf spring to said power induction member;
   (d) a journal is fixed to said lower section of said power induction member and configured to provide a means for receiving an axle of said vehicle, the center of said journal being located asymmetrically to the neutral axis of said leaf spring;
   (e) the outermost face of said one end of the leaf spring extending beyond the effective center of said journal a distance substantially equal to the distance of said journal below the neutral axis of said leaf spring; and
   (f) said power induction member cooperating with said leaf spring to provide means for creating a moment forces to offset other forces to reduce other loads on the leaf spring caused by static and dynamic forces.

7. The apparatus according to claim 6 herein said leaf spring has with a height dimension and a width dimension, said height dimension being continuously reduced as it approaches said power induction member.

8. The apparatus according to claim 7 wherein said leaf spring is made of glass fiber reinforced synthetic resin having an upper layer, a lower layer and a middle layer; said upper and lower layers having directed glass fibers extending the entire length of said spring; and said middle layer having undirected fibers embedded in a synthetic resin matrix.

9. The appartus according to claim 8 wherein said height dimension of said end portion of the leaf spring within said induction member continuously increases in length to turn a wedge configuration.

* * * * *